(12) United States Patent
Shoemaker et al.

(10) Patent No.: US 6,172,329 B1
(45) Date of Patent: Jan. 9, 2001

(54) ABLATED LASER FEATURE SHAPE REPRODUCTION CONTROL

(75) Inventors: Curtis L. Shoemaker, Round Rock; Daniel J. Treadwell, Cedar Park, both of TX (US); Berthold Burghardt, Goettingen (DE); Sergei V. Govorkov, Ft. Lauderdale, FL (US)

(73) Assignees: Minnesota Mining and Manufacturing Company, St. Paul, MN (US); MicroLas Lasersystem GmbH; Lambda-Physik GmbH, both of Goettingen (DE)

( * ) Notice: Under 35 U.S.C. 154(b), the term of this patent shall be extended for 0 days.

(21) Appl. No.: 09/198,160

(22) Filed: Nov. 23, 1998

(51) Int. Cl.$^7$ .................................................. B23K 26/00
(52) U.S. Cl. .............................. 219/121.69; 219/121.71; 264/400
(58) Field of Search ......................... 219/121.68, 121.69, 219/121.7, 121.71, 121.73, 121.74, 121.75; 264/400

(56) References Cited

U.S. PATENT DOCUMENTS

| | | | |
|---|---|---|---|
| 4,491,383 | * | 1/1985 | Pera et al. .............................. 359/201 |
| 4,551,608 | * | 11/1985 | Opower ........................ 219/121.74 X |
| 4,626,652 | * | 12/1986 | Bjork et al. ...................... 219/121.68 |
| 4,733,944 | | 3/1988 | Fahlen et al. . |
| 4,908,493 | * | 3/1990 | Susemihl .......................... 219/121.67 |
| 4,923,772 | | 5/1990 | Kirch et al. . |
| 4,940,881 | | 7/1990 | Sheets . |
| 5,057,664 | * | 10/1991 | Johnson et al. .................. 219/121.69 |
| 5,091,626 | * | 2/1992 | Lewis et al. ..................... 219/121.69 |
| 5,298,351 | | 3/1994 | Bobroff et al. . |
| 5,378,137 | | 1/1995 | Asakawa et al. . |
| 5,414,559 | | 5/1995 | Burghardt et al. . |
| 5,417,897 | | 5/1995 | Asakawa et al. . |
| 5,610,733 | | 3/1997 | Feldman et al. . |

FOREIGN PATENT DOCUMENTS

| | | |
|---|---|---|
| 4-270091 | * 9/1992 | (JP) . |
| 5-185254 | * 7/1993 | (JP) . |
| 6-182574 | * 7/1994 | (JP) . |
| 97/06462 | * 2/1997 | (WO) . |

OTHER PUBLICATIONS

"Diffractive microlenses replicated in fused silica for excimer laser–beam homogenizing", Nikoladjeff et al., *Applied Optics*, vol. 36, No. 32, pp.8481–8489 (1997).

* cited by examiner

Primary Examiner—Samuel M. Heinrich
(74) Attorney, Agent, or Firm—Darla P. Fonseca

(57) ABSTRACT

This invention concerns a process useful for increasing the accuracy of the shape of a laser ablated feature formed on a substrate, especially where the substrate is a polymeric article. The process includes irradiating the polymeric article with laser light that has passed through a retardation plate selected from stationary adjustable plates, rotating plates or spinning plates, preferable in multiples of quarter-waves or half-waves. This invention also concerns a laser apparatus useful for making ablated features in a substrate having a radiation source; a mask positioned between the radiation source and a substrate to be irradiated, and a retardation plate which is stationary and adjustable, rotating or spinning plates.

17 Claims, 8 Drawing Sheets

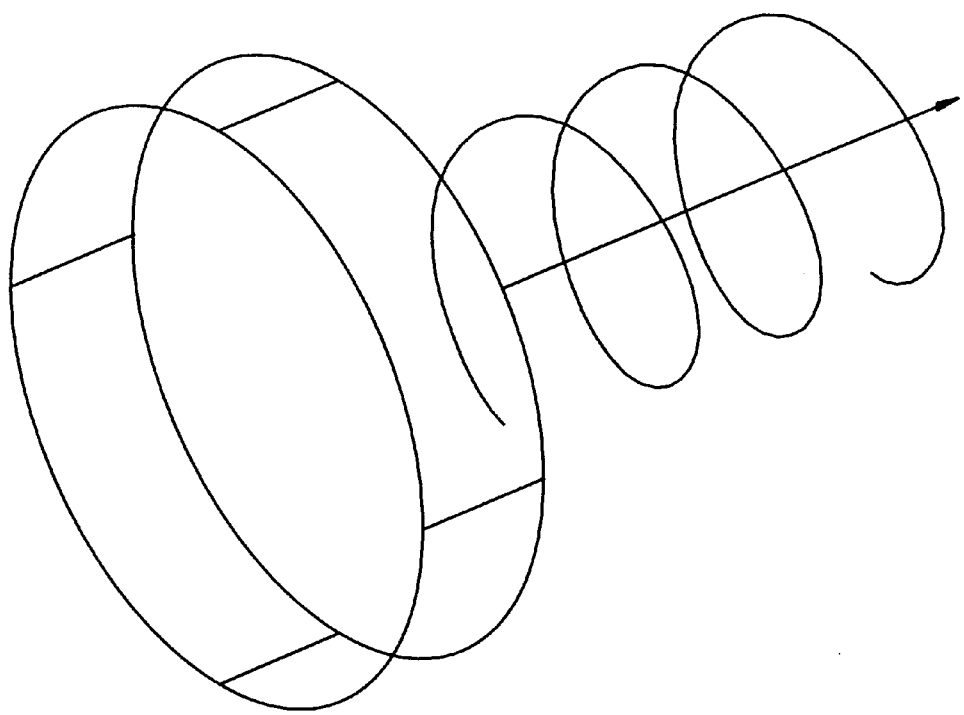
Fig. 6A
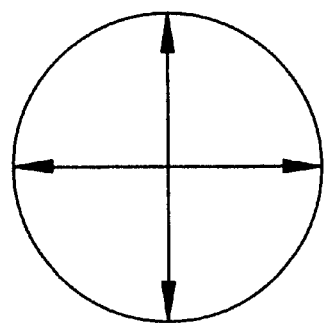 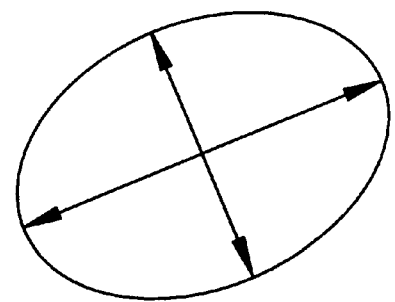
Fig. 6B  Fig. 6C

ABLATED LASER FEATURE SHAPE REPRODUCTION CONTROL

BACKGROUND OF THE INVENTION

1. Field of The Invention

This invention pertains to a method and an apparatus that forms ablated features in substrates exhibiting more accurate shapes with less shape distortion, and is especially applicable to polymer substrates.

2. Description of the Related Art

The laser ablation of features on polymer materials using a mask and imaging lens system is well known. In this process, features on the mask are illuminated with laser light. The laser light that passes through the transparent features of the mask is then imaged onto the substrate such as a polymeric film where the ablation process occurs.

FIG. 1 illustrates a basic layout of a conventional excimer laser machining system. Typically, the system is controlled by a computer with an interface to the operator of the system. The computer controls the firing of the pulsed laser system and a servo system. The function of the servo system is to position the mask and substrate chuck for proper registration of the laser milled pattern with respect to other features on the substrate. For this purpose, a vision system (not shown) is often interfaced to the computer system. The servo system or computer may control an attenuator module, to vary the amount of UV radiation entering the system. Alternatively, the laser pulse energy may be varied by adjusting the laser high voltage or a control set point for energy, maintained by the laser's internal pulse energy control loop.

The UV beam path is indicated in this figure with arrows (schematic only as these are not intended to be actual raypaths, which are not typically parallel) which show the flow of UV energy within the system. The UV power originates at the pulsed excimer laser. The laser typically fires at 100–300 Hz for economical machining with pulses that have a duration of about 20–40 nanoseconds each. The typical industrial excimer laser is 100–150 watts of time average power, but peak powers may reach megawatts due to the short duration of the pulse. These high peak powers are important in machining many materials.

From the output end of the laser, the UV energy typically traverses an attenuator; however, this is an optional assembly not present in all laser machining systems. The attenuator performs either or both of two possible functions. In the first function, the attenuator compensates for the degradation of the optical train. The attenuator thus used, allows the laser to run in a narrow band of pulse energies (and hence a restricted range of high voltage levels), allowing for more stable operation over the long term. With new optics in the system, the attenuator is set to dissipate some of the power of the laser. As the optics degrade and begin to absorb energy themselves, the attenuator is adjusted to provide additional light energy. For this function, a simple manual attenuator plate or plates can be used. The attenuator plates are typically quartz or fused silica plates with special dielectric coatings on them to redirect some of the laser energy toward an absorbing beam dump within the attenuator housing.

The other possible function of the attenuator is for short term control of laser power. In this case, the attenuator is motorized with either stepper motors or servo system, and the attenuator is adjusted to provide the correct fluence (energy per unit area) at the substrate for proper process control.

From the attenuator, the UV energy propagates to a beam expansion telescope (optional). The beam expansion telescope serves the function of adjusting the cross sectional area of the beam to properly fill the entrance to the beam homogenizer. This has an important effect on the overall system resolution by creating the correct numerical aperture of illumination upon exit from the homogenizer. Typical excimer laser beams are not symmetric in horizontal vs. vertical directions. Typically, the excimer beam is described as "top hat-gaussian," meaning that between the laser discharge direction (usually vertical), the beam profile is "top hat" (flat top and drops off sharply at the edges). In the other direction, the beam has a typical intensity profile that looks qualitatively gaussian, like a normal probability curve.

The telescope allows some level of relative adjustment in the distribution of power in these directions. This reduces (but does not eliminate) distortion of the pattern being imaged onto the substrate, due to differing numerical apertures (the sine of the half angle of the cone of light) in these orthogonal beam directions, since imaging resolution is directly a function of numerical aperture.

Between telescope and homogenizer we have shown a flat beam folding mirror. Most systems, due to space limitations, will contain a few such mirrors to fold the system into the available space. Generally, they may be placed between components, but in some areas, the energy density or fluence can be quite high. So mirror locations are carefully chosen to avoid such areas of high energy density. In general, the designer of such a system will try to limit the number of folding mirrors in order to minimize optics replacement cost and alignment difficulty.

The UV light next enters the beam homogenizer. The purpose of the homogenizer is to create a uniform intensity of the illumination field at the mask plane. It also determines the numerical aperture of the illumination field (the sine of the half angle of the cone of light impinging on the mask), which as stated above, has an impact on overall system resolution. Since certain parts of the excimer beam are hotter than others, uniform illumination requires that the beam be parsed into smaller segments, and stretched and overlaid at the mask plane. Several methods for this are known in the art, with some methods being based on traditional refractive optics, e.g., as disclosed in U.S. Pat. Nos. 4,733,944 and 5,414,559, both of which are incorporated herein by reference. Homogenization may also be based on diffractive or holographic optics, as in U.S. Pat. No. 5,610,733, both of which patents are incorporated by reference. Alternatively, it may be based on continuous relief microlens arrays ("Diffractive microlenses replicated in fused silica for excimer laser-beam homogenizing", Nikoladjeff, et. al, *Applied Optics*, Vol. 36, No. 32, pp. 8481–8489, 1997).

From the beam homogenizer the light propagates to a field lens, which serves to collect the light from the homogenizer and properly couple it into the imaging lens. The field lenses may be simple spherical lenses, cylindrical lenses, anamorphic or a combination thereof, depending on the application. Careful design and placement of field lenses are important in achieving telecentric imaging on the substrate side of the lens.

The mask is typically placed in close proximity to the field lens. The mask carries a pattern that is to be replicated on the substrate. The pattern is typically larger (2–5x) than the size desired on the substrate. The imaging lens is designed to (de)magnify the mask in the course of imaging it onto the part. This has the desired property of keeping energy density low at the mask plane and high at the substrate plane. High de-magnification usually imposes a limit on the field size available at the substrate plane.

The mask may be formed from chromium or aluminum coated on a quartz or fused silica substrate with the pattern being etched into the metallic layer by photolithography or other means. The reflecting and/or absorbing layer on the mask may comprise a sequence of dielectrics layers, such as those disclosed in U.S. Pat. Nos. 4,923,772 and 5,298,351, both of which are incorporated herein by reference.

The purpose of the imaging lens is to demagnify and relay the mask pattern onto the substrate. If the pattern is reduced by a factor of M in each dimension, then the energy density is raised by M2 multiplied by the transmission factor of the lens (typically 80% or so). In its simplest form, the lens is a single element lens. Typically, the lens is a complex multi-element lens designed to reduce various aberration and distortions in the image. The lens is designed with fewest elements to accomplish the desired image quality in order to increase the optical throughput and to decrease the cost of the imaging lens. Typically, the imaging lens is one of the most expensive parts of the beam train.

The imaging lens creates a de-magnified image of the pattern of the mask on the substrate. Each time the laser fires, an intense patterned area is illuminated on the substrate. As a result, etching of the substrate material results. Many substrate materials may be so imaged, especially polymeric materials. Polyimides under various trade names are the most common for microelectronic applications and inkjet applications.

This system described in FIG. 1 is a "typical" system. For non-demanding applications, the system can be further simplified and still produce parts, but with some sacrifice in part tolerances, repeatability, or both. It is not unusual for systems to make some departure from this typical architecture, driven by needs of the application. For example, in U.S. Pat. No. 4,940,881, incorporated herein by reference, it is disclosed that the insertion of a rotating refractive element between the imaging lens and the mask, will provide some level of control over the shape of the ablated hole.

There are many applications for laser ablation of polymeric materials. Some applications or portions thereof are not demanding in terms of tolerances, e.g., electrical vias, and the emphasis is on small size for high density and low cost. Other applications require very demanding tolerances and repeatability. Examples are fluid flow applications such as inkjet printhead nozzle manufacture and manufacture of drug dispensing nozzles. In these applications, the exact size, shape, and repeatability of manufacture are critical. The detailed architecture of the system is critical to obtaining tight tolerances and product repeatability. In addition, process parameters and the optical components all play important roles in obtaining the tightest possible tolerances, down to the sub-micron level.

The object of this invention is a means for controlling the shape of the laser ablated feature at the sub-micron level for these demanding applications, and limiting shape distortion. In this invention, we show two means to control the shape of ablated features such as holes or nozzles, by the agency of beam polarization effects. The laser beam itself may be randomly polarized, or may have a high degree of polarization, e.g., linear polarization, or another more general polarization state, depending upon the laser resonator configuration. Even if the laser is randomly polarized, the effect of beam attenuators and folding mirrors introduces partial polarization. Other system components, depending upon their details, may also impart some polarization. As round holes are particularly important for many electronics applications, we will focus primarily on ovality control for round holes, however, the invention is equally applicable to other ablated feature geometries.

When partially polarized light impinges on the sidewall of a partially ablated feature, as it is being formed, the reflectivity of the incident UV light is a function of polarization and the angle of incidence of the light. UV energy that is reflected, is by definition, not available for absorption and ablation. The result is that the amount of absorbed radiation varies azimuthally around a hole or nozzle as it is being formed, with the result that polarization induces ovality into the ablated hole or nozzle. Simple geometric considerations show that features of other shapes will also be distorted by this effect.

SUMMARY OF INVENTION

The present invention provides a solution to one or more of the disadvantages and deficiencies described above. This invention allows for the creation and control of the shapes of laser ablated features in polymer films. This invention capitalizes on the fact that polarized light absorbs and reflects differently than randomly polarized light. This phenomena can be used to provide laser ablated features that have less distortion, and thus more accurately reproduce the features on the mask, without introducing distortions, e.g., affecting the roundness or ovality of an ablated hole.

In accordance with this invention, a spinning half-wave or a stationary quarter-wave plate may be placed in the system to eliminate the negative effects of a substantially polarized beam in order to produce more accurately ablated features. In a broad aspect, the invention relates to reducing distortions in the shape of ablated features resulting from differences in reflectivity (and therefore, absorbtivity) due to polarization effects.

In one embodiment, rounder holes can be made in the practice of this invention then could be created without the use of rotating half-wave plate or stationary quarter-wave plate.

The present inventors have found that placing a rotating retardation plate, such as a half-wave plate, in the beam train can systematically alter the polarization state of light from the laser pulse to a pulse. This time averages the effects of polarization during the ablation and thereby causes more accurately shaped features to be produced as compared to a system without this optic, as shown in FIG. 1. With respect to the embodiment containing round holes, the addition of this optic in the beam path provides a highly significant reduction of hole ovality process variation. It should be noted in this context that the speed of rotation of the spinning half-wave plate in relation to the laser repetition rate is important. In order to produce a substantially round hole, the relationship between the laser repetition rate and the rotation speed must be adjusted so that the electric field vector points in a different direction for each laser pulse, and produces a nearly even distribution of the electric field vector. If the rotation frequency and laser firing frequency are integral multiples of each other, then electric field vector distribution will be systematic in nature and tend to create/preserve deviations from hole circularity.

Additionally, oval holes can be conveniently produced by polarizing the light source (e.g., prisms or Brewster angle plates in the resonator), and by using a quarter-wave plate or, preferably, half-wave plate. This allows the operator to easily change the principal axis of ovality without changing the mask.

Thus, through practice of this invention, the state of polarization from a polarized light source can be altered using either a half-wave plate or a quarter-wave plate. A mask containing round features when illuminated with linearly polarized light will create oval holes with the long axis corresponding to the axis of polarization, as illustrated in FIG. 3. Alternatively, a quarter-wave plate has the effect of changing linear polarization to circular or elliptical polarized light by varying the orientation of the quarter-wave plate as shown in FIG. 6. Laser ablating holes using the quarter-wave plate can create round or elliptical holes. The location of the long axis of ovality can be changed by simply rotating the quarter-wave plate to a preferred fixed orientation as shown in FIG. 7. The ability to modify the hole geometry by simply changing the orientation of one optic without changing the projection mask is a powerful and flexible process parameter.

It is envisioned that the process of this invention may be employed to ablate a variety of laser ablated features and materials. For instance, it is envisioned that this invention may be used to etch patterns in organic or inorganic photoresist during semiconductor fabrication using a variety of radiation sources such as X-rays and ultraviolet light including deep ultraviolet light. In addition, it is contemplated that the process of this invention can be employed to ablate holes in substrates that either completely traverse the substrate or which bore a hole of a given depth which is less than the total depth of the substrate (known as "blind" vias or holes).

In one application, the laser is useful for forming holes in a polymer substrate for an ink jet printhead. During the firing of a thermal inkjet print head, a small volume of ink is vaporized. The vaporized ink causes a droplet to shoot through an orifice which is directed at the print media. The quality of thermal inkjet printing is dependent on the characteristics of the orifice. Critical attributes of the orifice include shape of the hole exit shape including ovality, hole wall profile, and the like.

In a broad respect, this invention provides a process useful for controlling the ovality of features made by laser ablation of a substrate, comprising: illuminating the substrate with laser light that has passed through a quarter-wave plate or a half-wave plate to form a feature in the substrate.

In another broad respect, this invention provides an apparatus useful for making holes in a substrate, comprising: a radiation source; a mask positioned between the radiation source and a substrate to be irradiated with radiation from the radiation source; a half-wave plate or quarter-wave plate positioned between the radiation source and the mask. Alternatively, a spinning half-waver plate or quarter-wave plate placed between the mask and the imaging lens would also provide shape control.

As used herein, these terms having the following meanings.

1. The term "ovality" means a figure equal to the diameter of the major axis minus the diameter of the minor axis.

2. The term "laser ablated feature" includes holes, bores, vias, nozzles, and the like, and may be fully ablated through the substrate or only partially through the substrate ("blind" features).

BRIEF DESCRIPTION OF THE DRAWINGS

FIGS. 6A–6C illustrate polarization and rotation of the electric field vector of laser light using a quarter-wave plate, with substantially linearly polarized light incident.

DETAILED DESCRIPTION OF THE INVENTION

Figure 1:
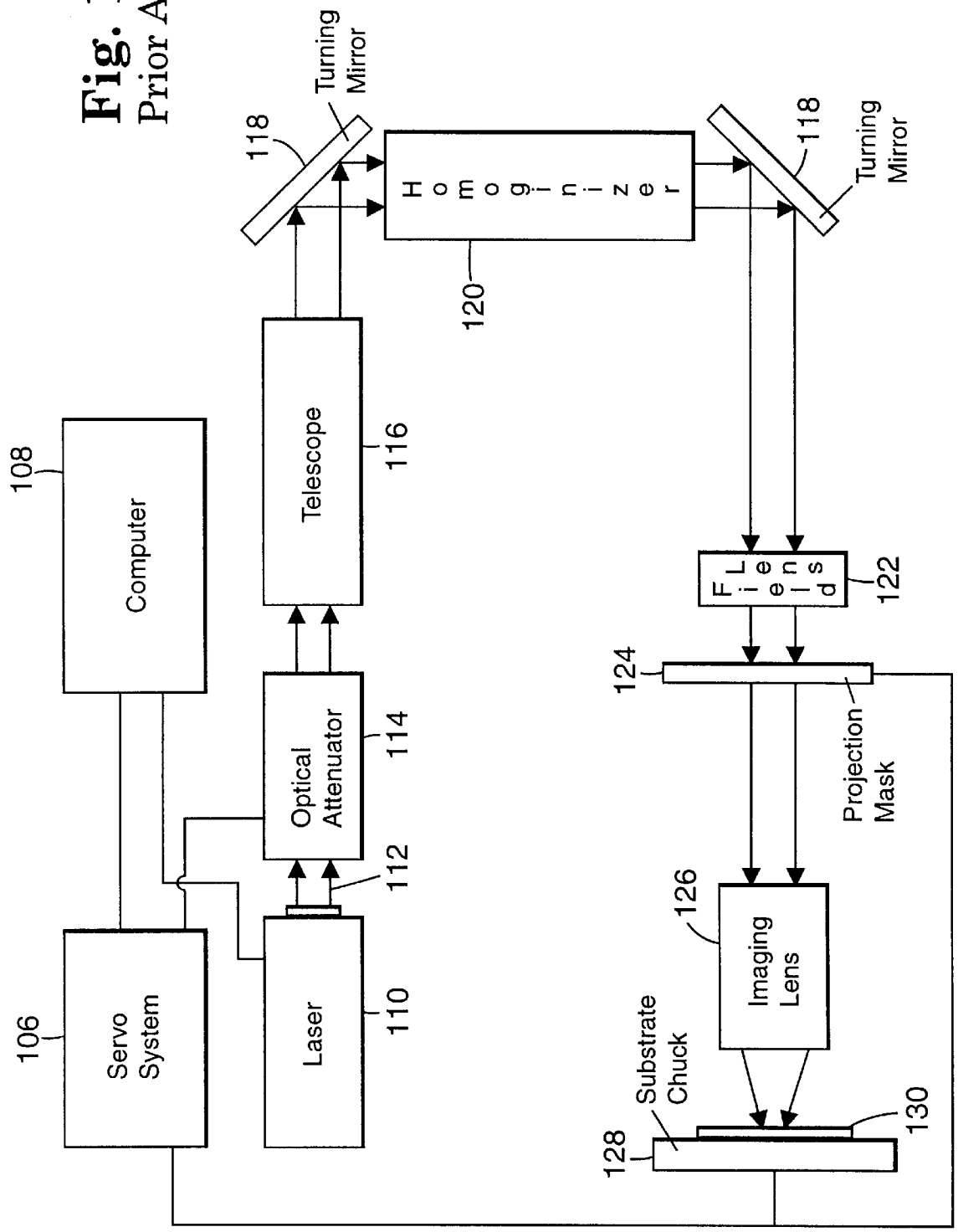
FIG. 1 illustrates an overview of a conventional laser system.

FIG. 1 shows a typical layout of a conventional laser system. The type of laser employed will be a function of the substrate to be ablated. For instance, the polymer film used to make inkjet print heads is typically a polyimide, such as Kapton TM and Upilex TM, having a thickness of approximately 50 micron (2 mils). For this application an excimer laser is commonly employed, such as rare gases such as krypton and xenon, halogens such as fluorine and chlorine, KrF (wavelength of 248 nanometers), and XeCl (wavelength of 308 nanometers). In general, the excimer laser commonly produces a pulse width in the range of 20–40 nanoseconds. The power of the laser may be selected depending on number and type of optical components in the system to deliver a fluence at the substrate in the range from about 400 to about 1000 millijoule/cm$^2$.

In FIG. 1, laser light 112 is discharged from laser 110. The system is controlled by a computer 108 which controls the firing of the pulsed laser system and a servo system 106.

Upon exiting the laser 110, beam 112 is usually passed though telescope 116. The beam 112 exiting an excimer laser is typically of rectangular shape and is frequently too small in cross-sectional area for many uses. Telescope 116 functions to change the beam size, as by stretching or compressing the beam in one or two axis using two or three lens telescopes well known in the art. The beam 112 also passes over a number of turning mirrors 118 sufficient to fold the beam 112 into the available space. The mirrors may be placed in various positions, before or after the beam homogenizer 120.

The beam 112 passes through homogenizer 120. The homogenizer may be either a refractive homogenizer well known in the art or a diffractive homogenizer. The purpose of the homogenizer is to evenly distribute the energy profile of the laser beam over the mask for uniform ablation. When the homogenizer 120 is a diffractive homogenizer, the laser 110 preferably provides light of low beam divergence, such as that produced by an unstable resonator as is well known in the art. When the homogenizer is a refractive homogenizer, a stable resonator may be used because the refractive homogenizer is less sensitive to highly divergent rays.

One method of reducing beam divergence is to use intra-cavity prisms in the laser. The function of the intra-cavity prisms is to remove highly divergent rays emanating from the excimer radiation source, with the resulting beam being favored by the diffractive homogenizer. Since the prisms tend to polarize the beam, the wave-plate of this invention is advantageously used, as discussed herein. An unstable resonator accomplishes the same result as use of prisms in combination with the wave plate. However, even a system using an unstable resonator may produce unwanted hole ovality due to the partially polarizing effects of attenuator substrates, mirrors, and other optical surfaces.

Upon leaving the homogenizer 120, laser beam 112 passes through field lens 122 onto projection mask, or imaging mask 124. Field lens 122, couples the illumination field into the imaging lens and places the pupil at the telecentric stop of the lens.

Useful imaging masks for the practice of this invention are well known. One representative example of a type of mask which can be used in the practice of this invention is described in U.S. Pat. 5,378,137. Typically, a mask comprises a clear, fused quartz substrate having a thin opaque or reflective layer. The opaque material may be a layer of chrome that has been sputtered onto the substrate, a ultraviolet enhanced coating, or any other suitable reflective or otherwise opaque coating. Alternatively, a reflective material may be deposited on the clear substrate such as multiple, alternating dielectric layers having different refractive indices, and having a suitable number of layers and layer thickness that are effective to provide partial or total light destruction caused by the light being reflected out of phase.

The projection mask 124 includes apertures in the same shape as the desired ablation features formed into the reflecting or absorbing layer which blocks a portion of the laser light 112 so as to form a pattern of laser light to be projected onto the substrate 130, held in place by substrate chuck 128, after passing through projection or imaging lens 126. The mask can also be modified to achieve varying wall slope angles of the ablated feature, as in U.S. Pat. No. 5,417,897.

The power of the imaging lens may vary depending on the project, and typically provides a step down to concentrate the beam. For instance, the projection lens may be a 5× lens which reduces the image from the projection mask 124 by a factor of five, but increases the fluence by 25 (multiplied by the transmission factor of the lens, typically 70–90%).

Figure 2:
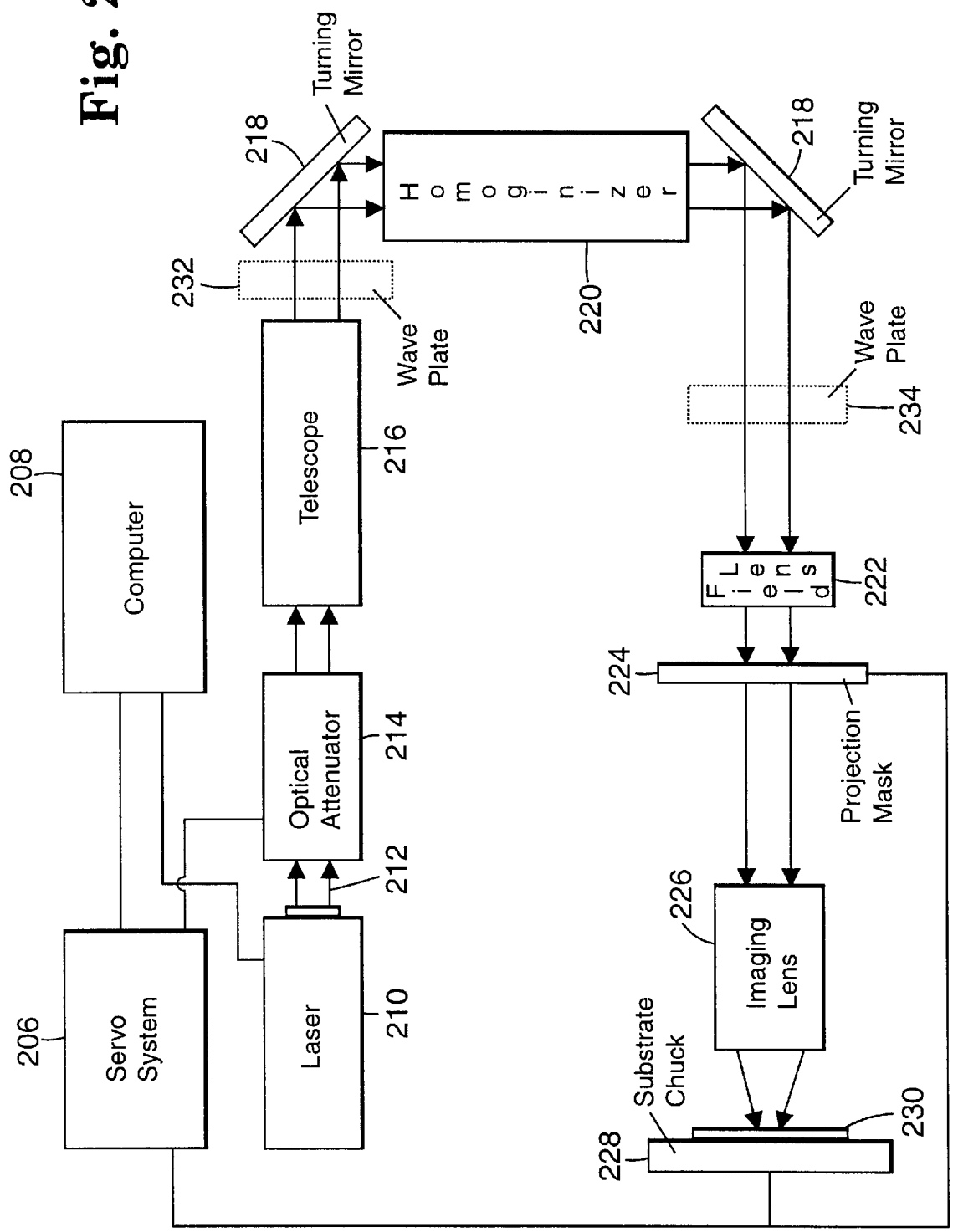
FIG. 2 illustrates a view of a laser system showing two options for insertion of wave-retardation plates.

FIG. 2 illustrates a laser system including a wave-plate of this invention. In FIG. 2, laser 210 emits laser light 212. In FIG. 2, the laser light 212 first enters optional attenuator 214. Thereafter, laser light 212 passes through telescope 216. After passing though telescope 216, laser light 212, hits wave-plate 232, in a preferred configuration.

The wave-plate should be placed in the beam in a position such as this where the rays of light are most nearly parallel to the optical axis. In addition, this position of the wave-plate will reduce or eliminate the effects of any tilt or wedge in the wave-plate if it is spinning during ablation, so that the image will be stationary when it impinges on the mask. The wave-plate may be located elsewhere in the system, preferably after the attenuator and as many mirrors as possible, as these elements alter polarization. The usable life of the wave-plate is a function of the strength of beam, with the strength of the beam decreasing as it contacts or passes through optical components in the system. Hence, the lifetime of the optic can be a factor in where to place the wave-plate.

A second useful position for the wave-plate is at position 234. In this position, the light is less parallel to the optical axis than at position 225, but if the imaging system has a small numerical aperture, (e.g., in a sufficiently low resolution system), this position would be acceptable. However, this position being after the homogenizer, any tilt or wedge in this optic would affect the steadiness of the image on the mask. However, if the illumination field sufficiently overfills the features on the mask with homogeneous illumination, then this motion of the illumination field will have little effect on the final ablation results in the image plane.

A third option, not illustrated, would be between the mask 224 and imaging lens 226. Having the optic in this position could also create a small spherical aberration in the imaging system; however, this effect is small and of little consequence. Any wedge or tilt angle in a spinning optic in this location would influence the final ablation results due to an unsteady image.

Whichever option is used, the laser light 212 must strike the projection mask 224 and form a pattern of laser light to be projected onto the substrate 230 after passing through projection or imaging lens 226. The substrate is held in place by substrate chuck 228.

While only one wave-plate is used in this system, multiple wave retardation plates may be used in other systems of the invention.

When the substrate is a polymer such as a polyimide film, the polymer may be provided from a reel and positioned on the substrate stage in the laser system. The laser is then repeatedly pulsed for a predetermined amount of time to ablate polymer to form a feature. A variety of factors affect the geometry of the feature, including use of wave-plate as discussed herein, power, fluence, number of laser pulses, and so forth. The finished polymer is then removed with fresh polymer being positioned on the stage.

Figure 3A:
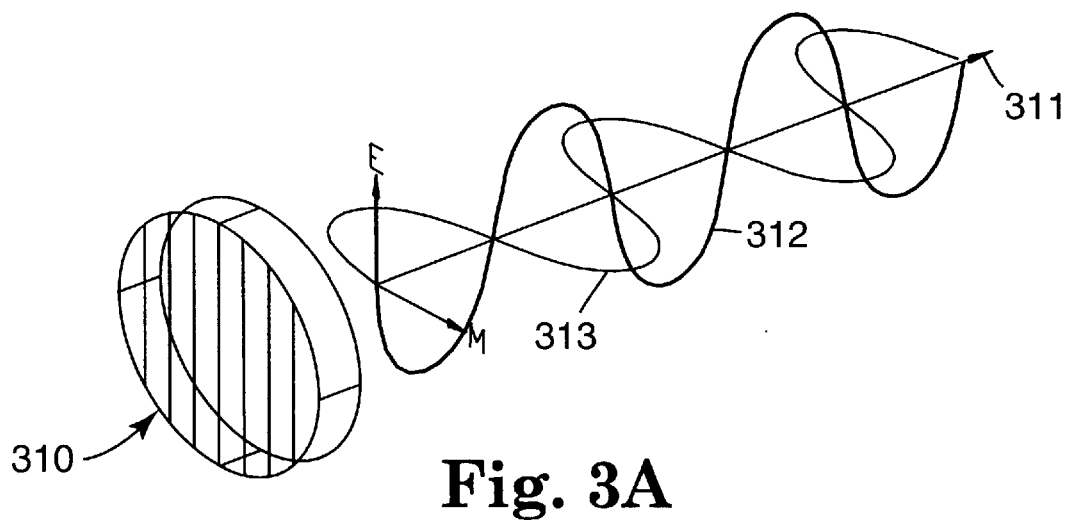
FIGS. 3A through 3D illustrate that the major axis of hole ovality follows the electric field vector when a half wave plate is used in a substantially linearly polarized beam.
Figure 3B:
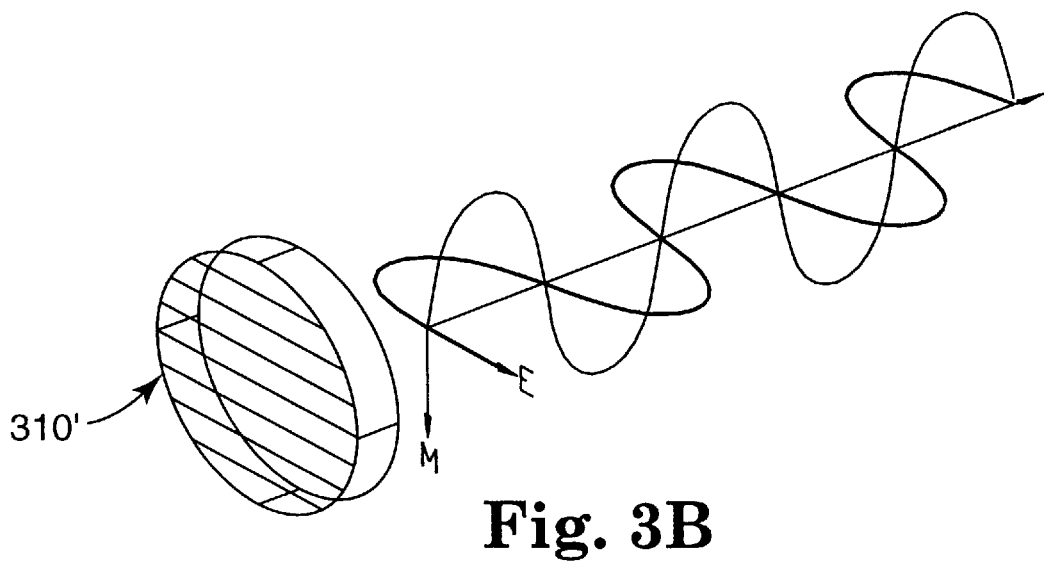
Figure 3C:
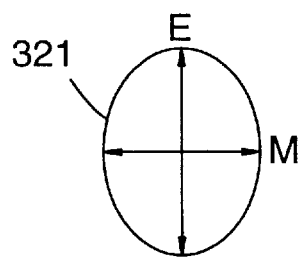
Figure 3D:
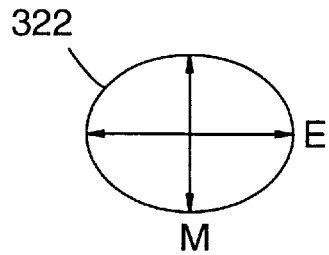

FIGS. 3A–3D illustrate ovality of a hole made by passing the laser light through a stationary half-wave plate 310 to polarize the laser light 311. In FIG. 3A, a beam of laser light 311 is composed of an electric field vector 312 (the "E" field vector) and a magnetic field vector 313 (the "M" field vector). The major axis of an exit hole made by laser ablation of a substrate is known to be aligned with the electric field vector. Thus, the roundness (ovality) of the exit hole is affected by the "E" vector, as depicted, in FIGS. 3C by oval 321, which shows the electric field vector aligned with major axis of hole ovality, for the vectors shown in 3A. Likewise, in FIG. 3B, the laser light is passed through a stationary half-wave plate having a differing axis of polarization. The electric field vector and the magnetic field vector are opposite to that of FIG. 3A. Thus, for this configuration, the ovality of the exit hole shown by oval 322 in FIG. 3D, again being aligned with the major axis of hole ovality.

A polyimide film having a thickness of 50 microns was illuminated with laser light from a system as depicted in FIG. 2 to form holes having an exit diameter of about 30 microns. With a linear beam polarization, the average major axis was 1.17 microns (standard deviation of 0.42) for a stationary half-wave plate and was only 0.15 microns (standard deviation of 0.47) for a rotating half-wave plate. Ovality as defined in FIGS. 3, 4, 5, 6, and 7 is x(maximum)–y(maximum), as shown in FIG. 4C. This ovality definition is less desirable than (major axis–minor axis), and resulted from software limitations on the automated microscope used for the empirical study. However, the qualitative results and magnitude of the effect is clearly demonstrated even with these less than ideal measurements.

Figure 4A:
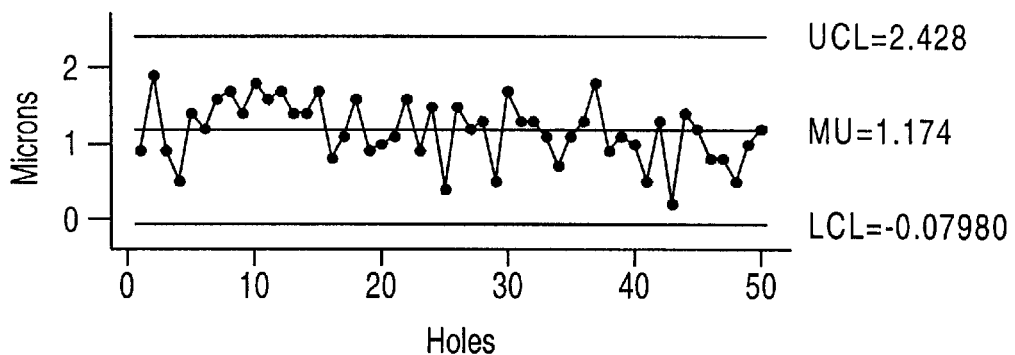
FIGS. 4A and 4B shows statistical process control charts for ovality data obtained by irradiation of a part using a stationary half-wave plate. These samples generated the data with mean ovality of 1.17 microns.
Figure 4B:
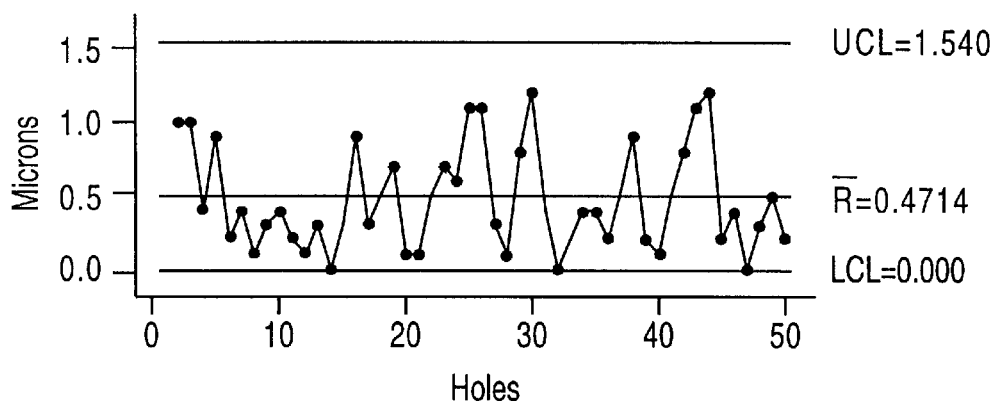
Figure 4C:
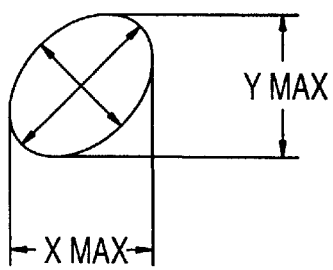

FIGS. 4A and 4B show the ovality data obtained by irradiation of a part (i.e., a substrate) with laser light that has passed through a stationary half-wave plate to form 50 holes. This chart is the statistical process control chart used to derive the results discussed above. The average ovality (difference between xmax and ymax) was found to be 1.17 microns with a standard deviation of 0.42 microns. It is important to note that the variation contributing to the standard deviation of 0.42 microns includes contributions from both the ablation process and the metrology tool. Metrology contributions are estimated to be a significant contributor to the observed random variations. As noted above, FIG. 4C shows the ovality definition used in these tests.

Figure 5A:
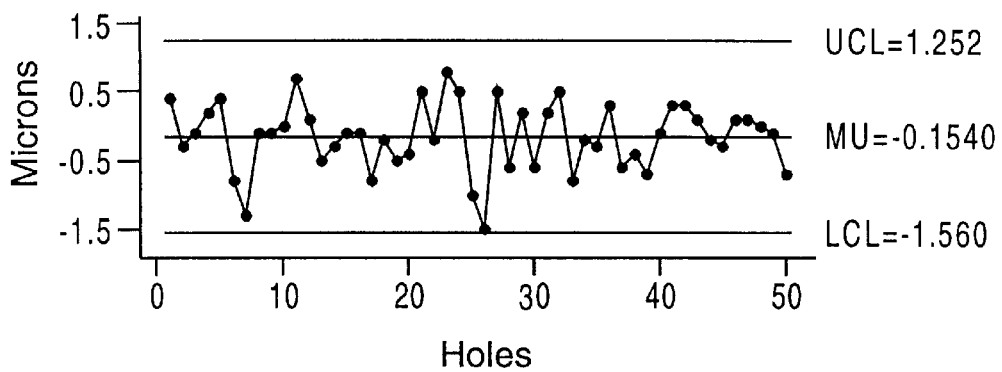
FIGS. 5A and 5B show statistical process control charts for ovality data obtained by irradiation of a part using a rotating half-wave plate. These samples generated the data with mean ovality of 0.15 microns.
Figure 5B:
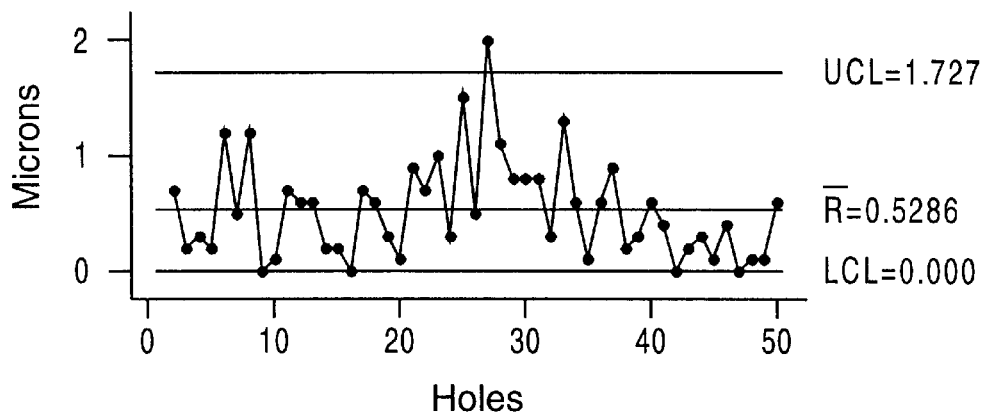
Figure 5C:
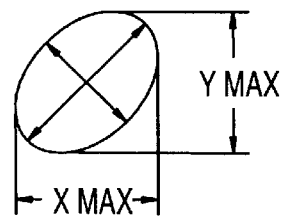

FIGS. 5A and 5B show the ovality data obtained by irradiation of a part with laser light that has passed through a spinning half-wave plate to form 50 holes. This chart is the statistical process control chart used to derive results summarized above. It is seen that the roundness of the hole generated by use of a spinning half-wave plate is significantly improved; i.e., the average ovality (X max minus Y max) is only 0.154, an order of magnitude smaller than when the stationary wave plate was used. FIG. 5C again shows the ovality definition used.

FIGS. 6A–6C illustrate that a substantially linearly polarized electric field (6A) is transformed by a stationary quarter wave-plate into either a circular (6B) or elliptically (6C) polarized beam, depending on the relative orientation with respect to the incident E field vector.

Figure 7A:
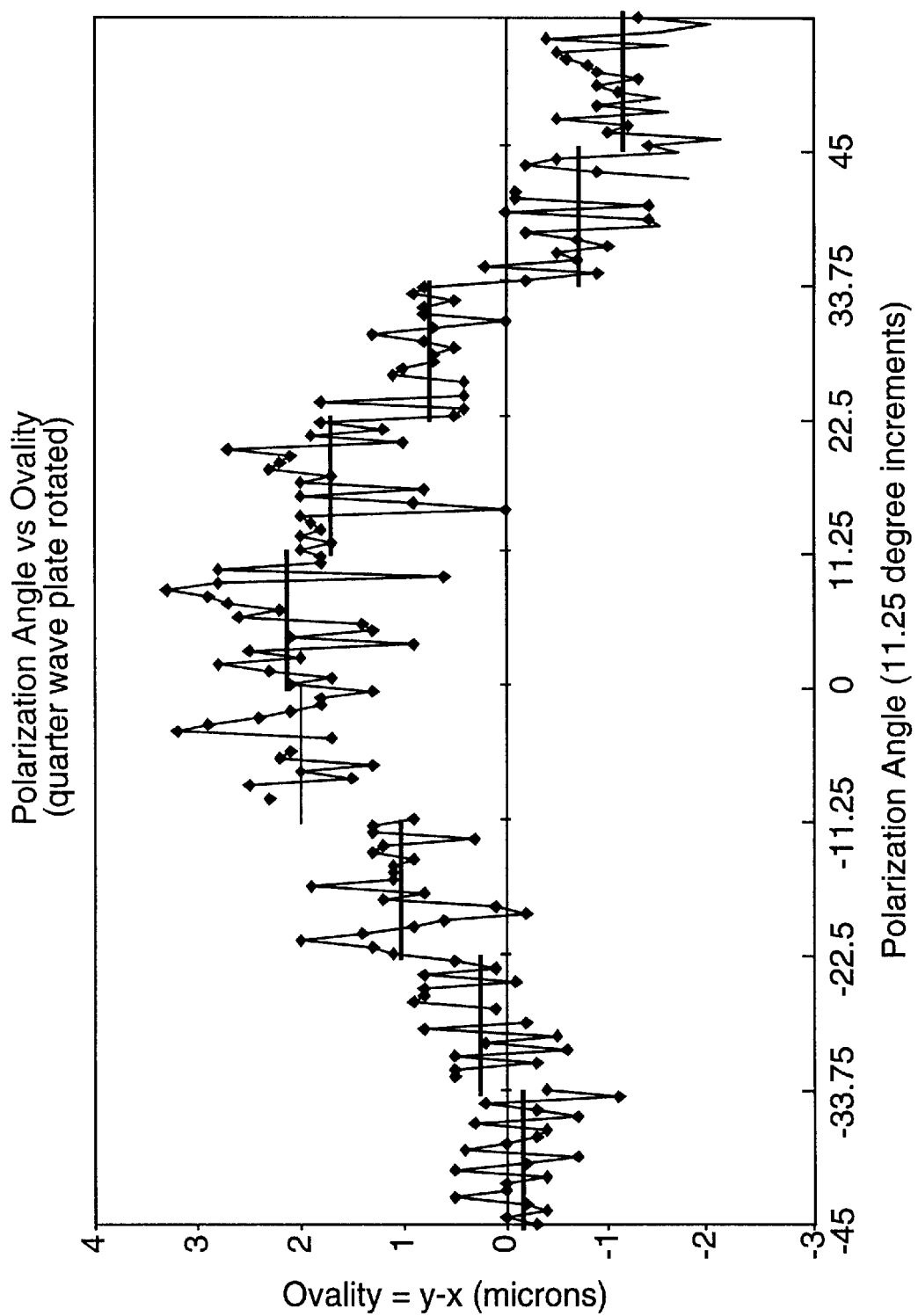
FIGS. 7A–7C illustrate the control of ovality that be obtained by rotating a quarter-wave plate to various fixed angles (e.g. not rotating during ablation) to achieve varying polarization states (7B), ranging from circular polarization to various elliptical polarizations.
Figure 7B:
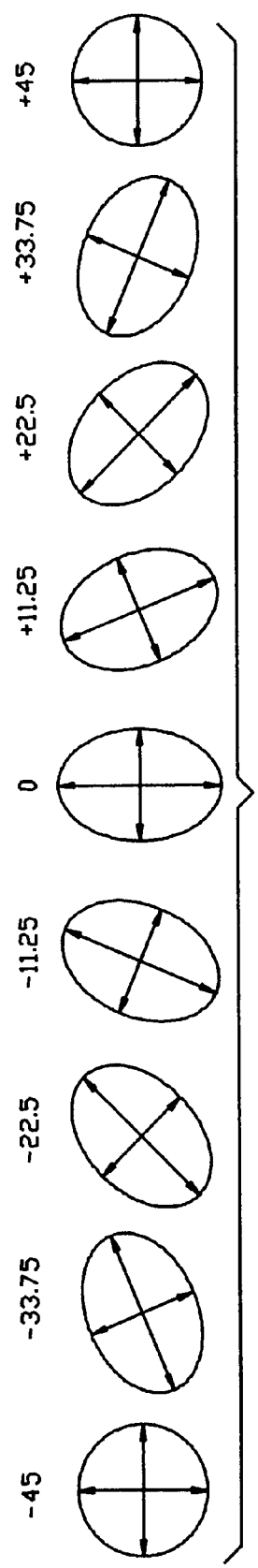
Figure 7C:
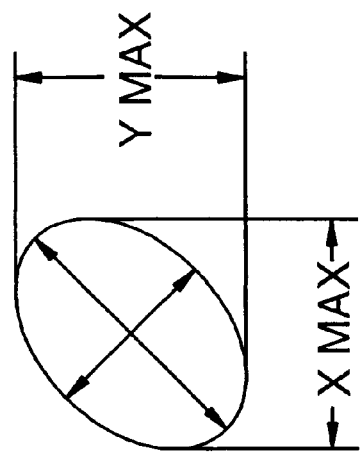

The phenomena of FIGS. 6A–6C is elaborated upon in FIGS. 7A–7C. The table depicted in FIG. 7A contains data points for ovality as a function of rotation angle of the quarter wave-plate relative to the incident E field vector. FIG. 7B shows how ovality may be controlled by the varying elliptically polarized beam, depending on the angle of rotation; each oval illustrates a particular angle, with the numbers noted above each oval. Thus, ovality is minimized and roundness maximized at a polarization angle of plus or minus 45 degrees, corresponding to circular polarization, and a 0 degree polarization angle results in the greatest ovality achieved when a quarter-wave plate is used. FIG. 7C shows the measurements of Y max, and X max, which are used for the calculation that ovality is equal to X Max minus Y Max.

What is claimed is:

1. A process useful for using a laser apparatus to control the ovality of a round or oval laser ablated nozzle having an exit diameter of less than about 30 microns, said nozzle being selected from an inkjet printhead nozzle or a drug delivery nozzle made by ablation of a polymeric substrate, comprising the step of: illuminating the polymeric substrate through a mask with laser light that has passed through a retardation plate selected from the group consisting of stationary adjustable plates, rotating plates and spinning plates, said nozzle having a more controlled ovality than said nozzle formed using said laser apparatus not containing a retardation plate.

2. The process of claim 1 wherein the retardation plate is selected from the group consisting of multiples of a quarter wave and multiples of a half wave.

3. The process of claim 1 wherein the retardation plate is selected from the group consisting of odd multiples of a quarter wave.

4. The process of claim 1 wherein the retardation plate is selected from the group consisting of odd multiples of a half wave.

5. The process of claim 1 wherein said retardation plate is stationary during ablation, said plate having an adjustable angle.

6. The process of claim 1 wherein said retardation plate is a rotating plate and said plate is mechanically rotated during said process to time average polarization effects.

7. The process of claim 1 wherein said retardation plate has been selected to compensate polarization of said laser light and produce substantially circularly polarized light.

8. The process of claim 1 wherein said laser light is generated by an excimer laser.

9. The process of claim 8 wherein said excimer laser employs gases selected from the group consisting of krypton, xenon, fluorine, chlorine, HCl, neon, and helium.

10. The process of claim 1 wherein said laser light is generated by a laser selected from the group consisting of Nd/YAG lasers, and Nd/YLF lasers.

11. The process of claim 1 wherein said laser ablated nozzles are registered by machine vision and precision motion control to features existing on said polymeric substrate.

12. The process of claim 1 wherein said retardation plate provides substantially linear polarization in a preselected direction thereby forming elliptically shaped nozzles having a principal axis aligned in said preselected direction.

13. The process of claim 1 wherein said nozzle made in the polymeric substrate is a round hole.

14. The process of claim 13 wherein the feature has an exit diameter less than about 30 microns.

15. The process of claim 13 wherein more than one nozzle is produced, and wherein the round holes have an average ovality of less than about 1 micron.

16. The process of claim 13 wherein more than one nozzle is produced and said holes have an average ovality no greater than about 0.1 5 micron.

17. The process of claim 1 wherein the polymeric substrate is polyimide.

* * * * *